(12) United States Patent
Liang et al.

(10) Patent No.: US 10,909,356 B2
(45) Date of Patent: Feb. 2, 2021

(54) FACIAL TRACKING METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Yicong Liang, Shenzhen (CN); Chengjie Wang, Shenzhen (CN); Shaoxin Li, Shenzhen (CN); Yandan Zhao, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 94 days.

(21) Appl. No.: 16/356,924

(22) Filed: Mar. 18, 2019

(65) Prior Publication Data

US 2019/0251337 A1 Aug. 15, 2019

Related U.S. Application Data

(63) Continuation of application No. PCT/CN2018/074953, filed on Feb. 1, 2018.

(30) Foreign Application Priority Data

Feb. 6, 2017 (CN) .......................... 2017 1 0068185

(51) Int. Cl.
*G06K 9/00* (2006.01)
*G06T 7/246* (2017.01)
*G06T 7/254* (2017.01)

(52) U.S. Cl.
CPC ..... *G06K 9/00308* (2013.01); *G06K 9/00248* (2013.01); *G06K 9/00261* (2013.01);
(Continued)

(58) Field of Classification Search
None
See application file for complete search history.

(56) References Cited

U.S. PATENT DOCUMENTS 7,352,881 B2 * 4/2008 Lestideau .......... G06K 9/00228
382/103
8,224,088 B2 * 7/2012 Itoh .................. G08B 13/19602
382/173

(Continued)

FOREIGN PATENT DOCUMENTS

CN 104182718 A 12/2014
CN 105512627 A 4/2016
(Continued)

OTHER PUBLICATIONS

Phothisane, P., Bigorgne, E., Collot, L., & Prévost, L. (Mar. 2011). A robust composite metric for head pose tracking using an accurate face model. In Face and Gesture 2011 (pp. 694-699). IEEE. (Year: 2011).*

(Continued)

*Primary Examiner* — Michelle M Entezari
(74) *Attorney, Agent, or Firm* — Oblon, McClelland, Maier & Neustadt, L.L.P.

(57) ABSTRACT

A facial tracking method can include receiving a first vector of a first frame, and second vectors of second frames that are prior to the first frame in a video. The first vector is formed by coordinates of first facial feature points in the first frame and determined based on a facial registration method. Each second vector is formed by coordinates of second facial feature points in the respective second frame and previously determined based on the facial tracking method. A second vector of the first frame is determined according to a fitting function based on the second vectors of the first set of second frames. The fitting function has a set of coefficients that are determined by solving a problem of minimizing a (Continued)

function formulated based on a difference between the second vector and the first vector of the current frame, and a square sum of the coefficients.

17 Claims, 6 Drawing Sheets

(52) U.S. Cl.
CPC ............. *G06T 7/248* (2017.01); *G06T 7/254* (2017.01); *G06T 2207/10016* (2013.01); *G06T 2207/30201* (2013.01)

(56) References Cited

U.S. PATENT DOCUMENTS

| | | | | |
|---|---|---|---|---|
| 8,730,333 | B2* | 5/2014 | Iwahashi | H04N 5/23254 348/208.4 |
| 9,697,599 | B2* | 7/2017 | Prasad | A61B 5/1128 |
| 9,836,831 | B1* | 12/2017 | Krishnaswamy | G06T 7/269 |
| 9,971,944 | B2* | 5/2018 | Shao | G06T 7/12 |
| 10,096,132 | B2* | 10/2018 | Zhou | G06K 9/22 |
| 10,218,996 | B2* | 2/2019 | Haruna | G06T 7/246 |
| 10,332,312 | B2* | 6/2019 | Zatepyakin | G06T 7/73 |
| 10,719,717 | B2* | 7/2020 | Lin | G06K 9/00778 |
| 10,769,415 | B1* | 9/2020 | Mostafa | G06K 9/036 |
| 10,848,662 | B2* | 11/2020 | Kinoshita | G06T 7/248 |
| 2006/0159177 | A1* | 7/2006 | Mellot | G06T 7/223 375/240.16 |
| 2007/0080851 | A1* | 4/2007 | Shapira | G01S 3/784 342/53 |
| 2008/0260212 | A1* | 10/2008 | Moskal | G06K 9/00315 382/118 |
| 2010/0211794 | A1* | 8/2010 | Bilobrov | G06K 9/00067 713/176 |
| 2012/0014562 | A1* | 1/2012 | Berkovich | G06K 9/00228 382/103 |
| 2012/0227014 | A1* | 9/2012 | Pforr | G03F 1/70 716/52 |
| 2016/0183780 | A1* | 6/2016 | Docherty | G02B 27/0093 351/206 |
| 2016/0229413 | A1 | 8/2016 | Morley et al. | |

FOREIGN PATENT DOCUMENTS

| | | |
|---|---|---|
| CN | 106204658 A | 12/2016 |
| CN | 106875422 | 6/2017 |

OTHER PUBLICATIONS

Dornaika, F., & Davoine, F. (2006). On appearance based face and facial action tracking. IEEE transactions on circuits and systems for video technology, 16(9), 1107-1124. (Year: 2006).*

Baykara, Muhammet, and Resul Daş. "Real time face recognition and tracking system." 2013 International Conference on Electronics, Computer and Computation (ICECCO). IEEE, 2013. (Year: 2013).*

Haber, Nick, et al. "A practical approach to real-time neutral feature subtraction for facial expression recognition." 2016 IEEE Winter Conference on Applications of Computer Vision (WACV). IEEE, 2016. (Year: 2016).*

Valstar, Michel François, Ioannis Patras, and Maja Pantic. "Facial action unit detection using probabilistic actively learned support vector machines on tracked facial point data." 2005 IEEE Computer Society Conference on Computer Vision and Pattern Recognition (CVPR'05)-Workshops. IEEE, 2005. (Year: 2005).*

Written Opinion and International Search Report dated May 2, 2018 in PCT/CN2018/074953 with concise English translation.

* cited by examiner

FACIAL TRACKING METHOD AND APPARATUS, STORAGE MEDIUM, AND ELECTRONIC DEVICE

RELATED APPLICATION

This application is a continuation of International Application No. PCT/CN2018/074953, file on Feb. 1, 2018, which claims priority to Chinese Patent Application No. 201710068185.3, entitled "FACIAL TRACKING METHOD AND APPARATUS" filed on Feb. 6, 2017. The entire disclosures of the prior applications are hereby incorporated by reference in their entirety.

FIELD OF THE TECHNOLOGY

The present disclosure relates to facial image processing techniques.

BACKGROUND OF THE DISCLOSURE

A facial registration algorithm is an important preprocessing step of facial recognition. Locations of key points in a facial picture can be determined by using the facial registration algorithm. Based on locations of the key points, more intelligent functions can be achieved in applications such as automatic image retouch and automatic facial beautification. In addition, action information of a user, for example, whether eyes of the user are closed and whether a mouth is opened, can be accurately determined, which facilitates applications such as living body detection and detection of fatigue driving.

In related technology, facial registration points are determined based on a single picture. Because information provided by the single picture is limited, it is difficult to obtain an accurate and stable registration point. To resolve the problem, based on the characteristic that information included in neighboring frames in a video is highly correlated, accuracy and stability of a registration result of a current frame of image are effectively improved by using auxiliary information provided by neighboring frames in some related technologies.

In one example, stability of a registration point can be improved by averaging registration results of a plurality of previous and subsequent frames. However, accuracy of registration points in video sequence that varies significantly can be severely reduced. In addition, a tracking result is delayed when a registration result of a subsequent frame is used, and consequently real-time performance cannot be ensured. In another example, an anti jitter rule is set to control jitter amplitudes of results of registration points of the previous and subsequent frames, to improve the stability of the registration point. However, the anti jitter rule typically is very complex, and it is difficult to consider various possible cases. In some particular cases, both accuracy and stability of the tracking result are obviously reduced. In a further example, registration points from a video is obtained by using deep learning networks such as a 3D convolutional neural network (3DCNN, used for motion recognition) or a long short-term memory (LSTM, which is a time-recursive neural network) with the video as input. In the solution, massive training sample videos need to be annotated, resulting in high costs for actual applications. Besides, this type of algorithm consumes higher time and memory overheads.

Currently, there is no effective solution to accurately acquire facial registration points with a low complexity.

SUMMARY

A facial tracking method can include receiving a first vector of a first frame in a video, and second vectors of a first set of second frames that are prior to the first frame in the video. The first vector is formed by coordinates of first facial feature points in the first frame and determined based on a facial registration method performed over the first frame. Each second vector is formed by coordinates of second facial feature points in the respective second frame and determined based on the method of claim 1. A second vector of the first frame is determined according to a fitting function. The fitting function specifies a relationship between the second vector of the first frame and the second vectors of the first set of second frames. The fitting function has a set of coefficients that are determined by solving a problem of minimizing a function. The function is formulated based on a difference between the second vector of the current frame and the first vector of the current frame, and a square sum of the coefficients.

An apparatus for facial tracking can include processing circuitry. The processing circuitry is configured to receive a first vector of a first frame in a video, and second vectors of a first set of second frames that are prior to the first frame in the video. The first vector is formed by coordinates of first facial feature points in the first frame and determined based on a facial registration method performed over the first frame. Each second vector is formed by coordinates of second facial feature points in the respective second frame and determined based on the method of claim 1. A second vector of the first frame is determined according to a fitting function. The fitting function specifies a relationship between the second vector of the first frame and the second vectors of the first set of second frames. The fitting function has a set of coefficients that are determined by solving a problem of minimizing a function. The function is formulated based on a difference between the second vector of the current frame and the first vector of the current frame, and a square sum of the coefficients.

A non-transitory computer-readable storage medium storing instructions is provided. The instructions, when executed by at least one processor, cause the at least one processor to perform the facial tracking method.

BRIEF DESCRIPTION OF THE DRAWINGS

The accompanying drawings described herein are intended to provide further understanding of the present disclosure and constitute a part of this application. Exemplary embodiments of the present disclosure and the description thereof are used for explaining the present disclosure rather than constituting the improper limitation to the present disclosure. In the accompanying drawings.

DESCRIPTION OF EMBODIMENTS

To make persons skilled in the art understand the solutions in the present disclosure better, the following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure shall fall within the protection scope of the present disclosure.

It is noted that the terms such as "first" and "second" in this specification, the claims, and the foregoing accompanying drawings of the present disclosure are intended to distinguish between similar objects rather than describe a particular sequence or a chronological order. It is understood that the data termed in such a way are interchangeable in proper circumstances, so that the embodiments of the present disclosure described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
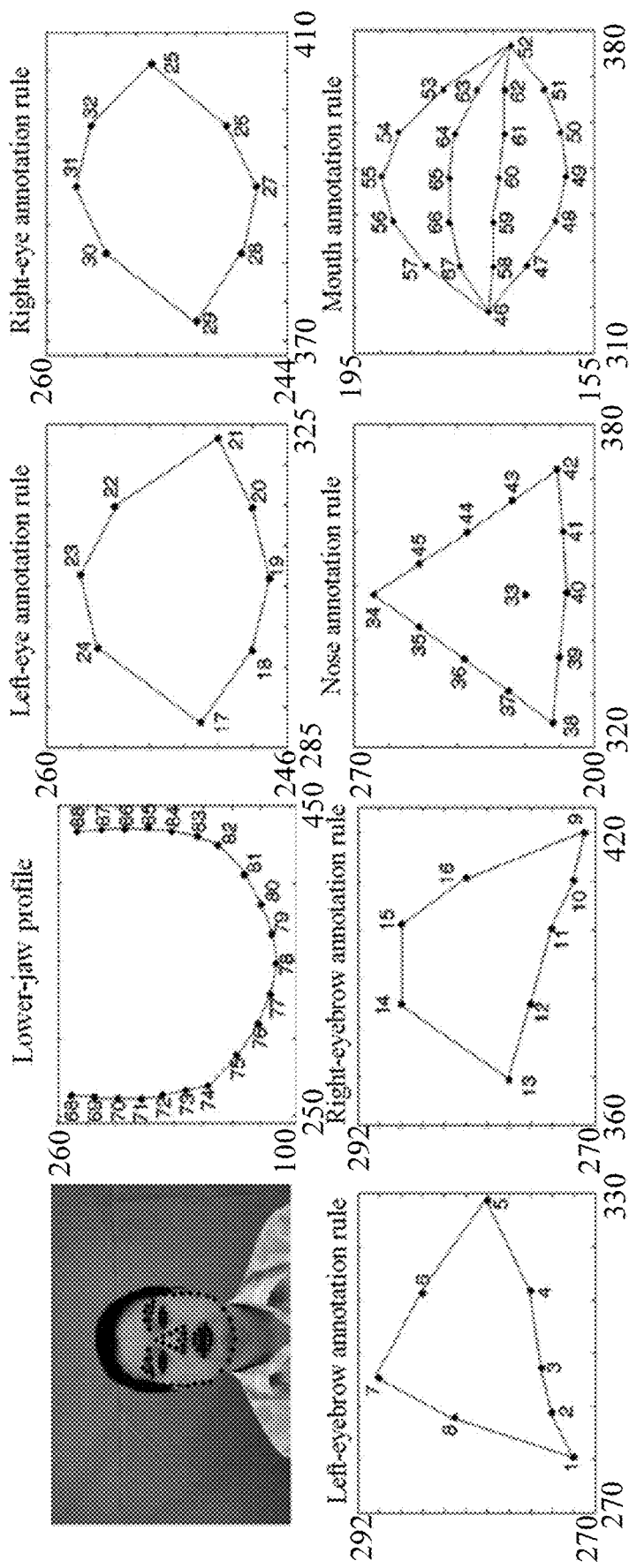
FIG. 1 shows examples of facial feature points according to an embodiment of the present disclosure.

First, some terms used in embodiments of the present disclosure are explained below:

In some embodiments, a facial key point can refer to a location on a face that in combination with other facial key points is indicative of a feature on the face. A facial key point may also be referred to as a feature point. As shown in FIG. 1, a plurality of facial key points in a plurality of facial areas may be determined according to annotation rules in the embodiments of this application. Optionally, each facial area may correspond to a plurality of facial key points, and information about each facial key point may be recorded by using location information (e.g., coordinates) of the facial key point in an image.

In one example, as shown in FIG. 1, a facial area may be divided into areas of a lower-jaw profile, a left eyebrow, a right eyebrow, a left eye, a right eye, a nose, and a mouth. In one example, 90 facial key points may be defined. For example, the first to the seventh facial key points are located in the area of the left eyebrow, the eighth to the sixteenth facial key points are located in the area of the right eyebrow, the seventeenth to the twenty-fourth facial key points are located in the area of the left eye, the twenty-fifth to the thirty-second facial key points are located in the area of the right eye, the thirty-third to the forty-fifth facial key points are located in the area of the nose, the forty-sixth to the sixty-seventh facial key points are located in the area of the mouth, and the sixty-eighth to the ninetieth facial key points are located in an area of the lower-jaw profile.

In other examples, the way of defining facial regions and feature points can be different from the FIG. 1 example. For example, the facial areas may alternatively be divided into left and right pupils, the tip of a nose, and left and right corners of a mouth. A division manner of the facial areas is not specifically limited in this application.

In some embodiments, a facial registration algorithm or process can refer to an image preprocessing method useful in a facial recognition process. For example, a facial registration process can be performed to obtain a facial key point from a facial image. Optionally, a facial registration algorithm may include operations for removing changes (e.g., caused by head pose variations) from an oriented face to generate a frontal face, such as a scale, rotation, and translation of the respective oriented facial image.

In some embodiments, accuracy of a registration point refers to proximity of a facial registration result to a real value of the registration point.

In some embodiments, stability of the registration point is a jitter degree between registration results obtained from neighboring frames in a facial video.

In some embodiments, a facial registration point tracking algorithm is an algorithm for improving accuracy and stability of a registration point of each frame based on information of a plurality of frames in the facial video.

Figure 2:
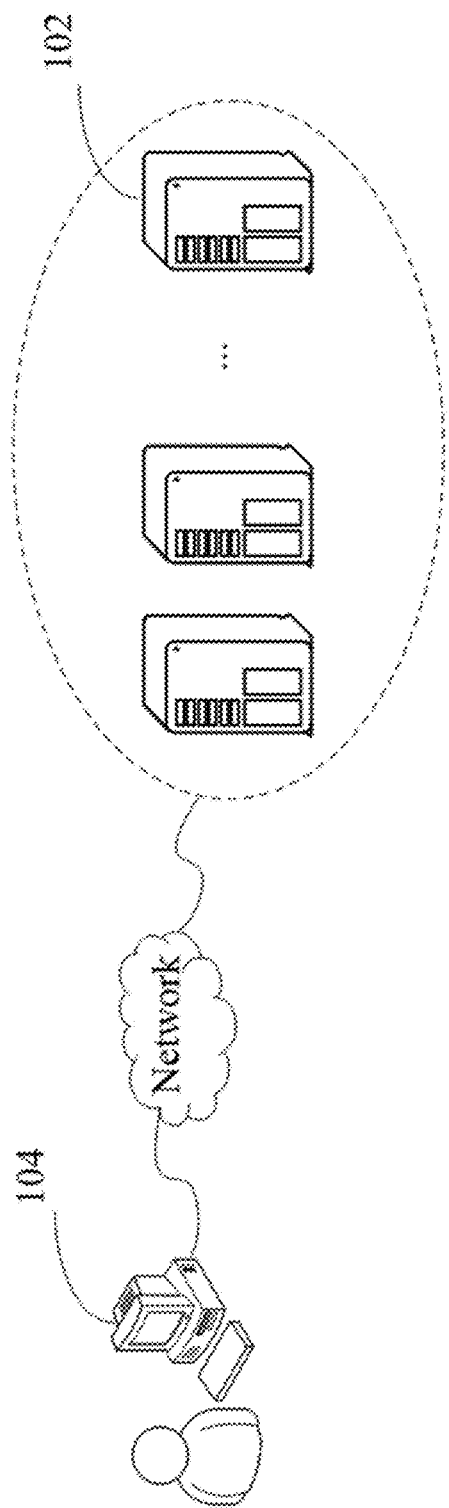
FIG. 2 is a schematic diagram of a network system implementing a facial tracking method according to an embodiment of the present disclosure.

According to the embodiments of the present disclosure, an embodiment of a facial tracking method is provided. In this embodiment, the facial tracking method may be applied to a hardware environment including a server 102 and a terminal 104 as shown in FIG. 2. The server 102 is connected to the terminal 104 through a network. The network includes, but is not limited to, a wide area network, a metropolitan area network, or a local area network. The terminal 104 can be a PC, a mobile phone, a tablet computer, and the like. The facial tracking method in this embodiment of the present disclosure may be performed by the server 102, or may be performed by the terminal 104, or may be performed by both the server 102 and the terminal 104. When the terminal 104 performs the facial tracking method in this embodiment of the present disclosure, the facial tracking method may alternatively be performed by a client installed in the terminal 104.

Optionally, the foregoing embodiment may be applied to the server. After obtaining a video, for example, a video, the server sequentially performs the facial tracking on each frame of image in the video, to obtain facial tracking information of each frame, and then obtain a facial tracking result of the video.

A frame (or a frame of image) can refer to an image or a picture in a video. The video may include a plurality of images consecutive in time. An image or a picture in the video is a frame of image, and the video generally includes a plurality of frames. A frame of image located previous to a current frame of image in the video is a prior frame of image, and a frame of image located subsequent to the current frame of image in the video is a subsequent frame of image. For example, a frame of image having a playing time earlier than that of a $K^{th}$ frame of image is a prior frame of the $K^{th}$ frame of image, and a frame having a playing time later than that of the $K^{th}$ frame is a subsequent frame of the $K^{th}$ frame of image. That is, a playing order or a presentation order of the prior frame of the $K^{th}$ frame is earlier than that of the $K^{th}$ frame, and a playing order or a presentation order of the subsequent frame of the $K^{th}$ frame is later than that of the $K^{th}$ frame of image.

Optionally, a frame can refer to an image in a sequence of facial images that are not a video. For example, the sequence of facial images can be a set of pictures manually taken at different times, or can be a subset of pictures in a video that are not adjacent to each other in time, or are not arranged in an order the same as the display order (e.g., a picture having a latter display time may be arranged before a picture having an earlier display order). The facial point tracking techniques described herein can be performed over the set of non-video pictures in a way similar to a sequence of pictures in a video.

In an embodiment, when receiving a facial recognition request to perform facial recognition, the server may obtain a video requested to be recognized, to analyze the video frame by frame. Specifically, the server performs facial registration processing on a current frame of image to obtain facial registration information (that is, facial feature information). For example, the server performs the facial registration processing on the current frame of image by using a facial registration algorithm, to obtain a coordinate vector of a plurality of pre-defined facial key points (namely, facial feature points). For example, if B points are defined, the obtained facial registration information includes a 2B-dimensional vector and is used as the facial feature information. The 2B-dimensional vector can include B pairs of coordinates corresponding to the B feature points.

The server obtains facial tracking information of prior frames of images. The facial tracking information is used for recording a tracking result determined by using an embodiment of the facial tracking method in this application. For example, the facial tracking information includes a coordinate vector that is determined using the facial tracking techniques disclosed herein. For example, the coordinate vector of the facial tracking information is a result of a fitting function. In contrast, a coordinate vector of the facial feature information is a result of a facial registration process.

Facial tracking information of the current frame of image is determined by using the facial feature information of the current frame and the facial tracking information of the prior frames of the current frame in some embodiments.

Figure 3:
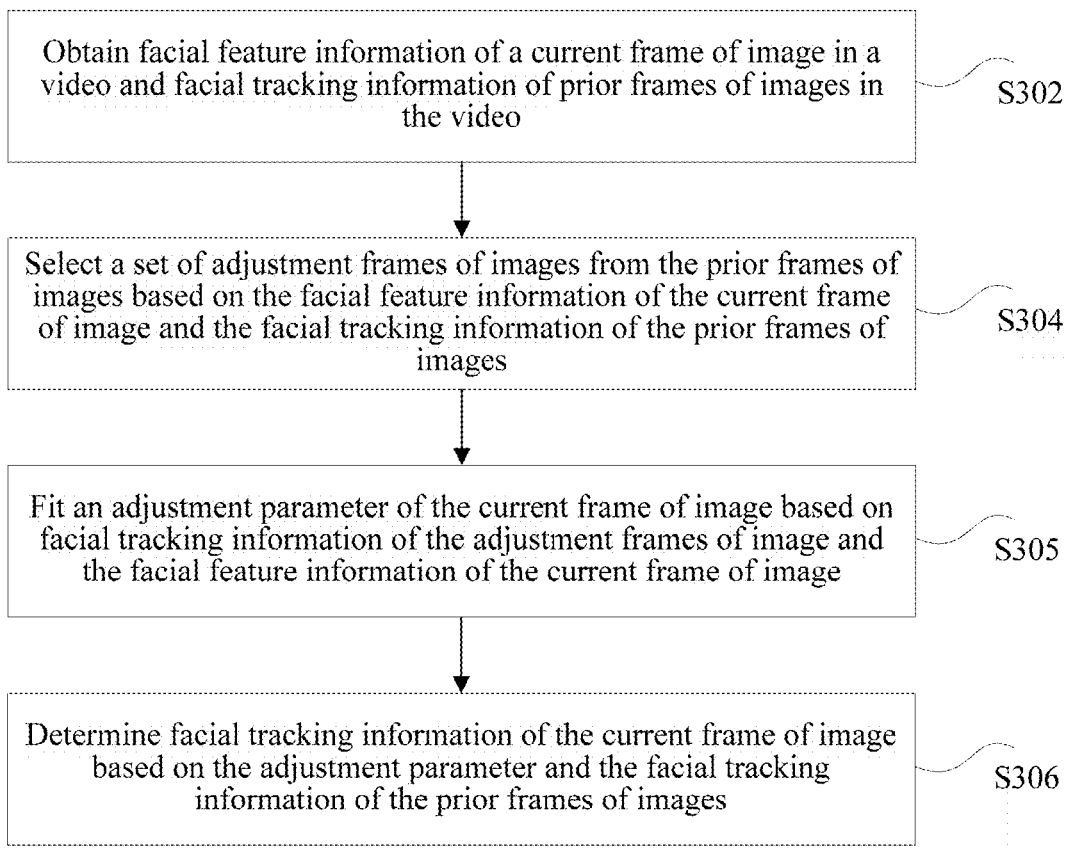
FIG. 3 is a flowchart of a facial tracking method according to an embodiment of the present disclosure.

FIG. 3 is a flowchart of a facial tracking method according to an embodiment of the present disclosure. As shown in FIG. 3, the method may include the following steps:

Step S302: Obtain facial feature information (e.g., a coordinate vector) of a current frame of image in a video and facial tracking information of prior frames of images in the video. The prior frames of images are frames of images located previous to the current frame of image in the video, the facial feature information records information of facial feature points in the current frame of image, and the facial tracking information is used for recording facial tracking results of the prior frames of images.

Step S304: Select a set of adjustment frames of image from the prior frames of images based on the facial feature information of the current frame of image and the facial tracking information of the prior frames of images.

Step S305: Fit an adjustment parameter (e.g., a set of coefficients of a function) of the current frame of image based on facial tracking information of the adjustment frames of image and the facial feature information of the current frame of image.

Step S306: Determine facial tracking information of the current frame of image based on the adjustment parameter and the facial tracking information of the prior frames of images.

According to the foregoing embodiment, the set of adjustment frames of images is selected from the prior frames of images based on the facial feature information of the current frame of image and the facial tracking information of the prior frames of images. The adjustment parameter can be used for reducing an error of the facial tracking information of the current frame of image, and can be determined based on information of the adjustment frames of images. The facial tracking information of the current frame of image can be determined by using the adjustment parameter. According to the foregoing embodiment, the adjustment parameter is determined based on information about the prior frames of images rather than information about a subsequent frame of image, so that no delay is generated, and real-time performance can be ensured. In addition, in the solution, no complex anti jitter rule needs to be configured, and therefore the manner of obtaining tracking information is simplified. Further, in the solution, the accurate facial tracking information of the current frame can be determined without annotating massive training samples, thereby resolving a problem that it is difficult to ensure both high accuracy and low complexity by using a facial registration point tracking algorithm in the related technology, and ensuring high accuracy of the facial tracking information in a simplified processing manner.

In the technical solution provided in step S302, a server obtains the facial feature information of the current frame of image in the video. The server may perform facial registration processing on the current frame of image to obtain the facial feature information. For example, the facial registration processing is performed on the current frame of image by using a facial registration algorithm to obtain a coordinate vector of a plurality of pre-defined facial key points (namely, facial feature points). For example, a point A can have a pair of coordinates (x1, y1). If B points are defined, obtained facial registration information includes a 2B-dimensional vector and is used as the facial feature information. For example, if 90 feature points are pre-defined to recognize a face, the facial feature information may include a 180-dimensional vector (e.g., 180 coordinates). Horizontal coordinates and vertical coordinates of the 90 feature points are indicated by using the 180-dimensional vector.

The server obtains the facial tracking information of the prior frames of images located previous to the current frame of image in the video. The facial tracking information is used for recording the facial tracking results of the prior frames of images, and the facial tracking results are facial tracking results of the prior frames of images that are determined based on the facial tracking method in this embodiment of this application.

The video may include a plurality of images consecutive in terms of time. A frame of image located previous to the current frame of image in the video is a prior frame of image, and a frame of image located subsequent to the current frame of image in the video is a subsequent frame of image. A playing order or a presentation order of a prior frame of image of a $K^{th}$ frame of image is earlier than that of the $K^{th}$ frame, and a playing order or a presentation order of a subsequent frame of image of the $K^{th}$ frame of image is later than that of the $K^{th}$ frame of image.

In other examples, a sequence of images or pictures under processing may be non-video pictures.

In the technical solution provided in step S304-S305, after the facial feature information of the current frame of image and the facial tracking information of the prior frames of images are obtained, the adjustment parameter of the current frame of image is determined based on the obtained facial feature information of the current frame of image and the obtained facial tracking information of the prior frames of images.

For example, an error between a facial registration point (to be specific, information obtained through registration on a facial feature point) derived from two different frames in a facial video and a location of a real key point is classified into two types: a system error and a random error. The system error is an error caused by a change of facial locations in the two frames, and the random error is an error caused by the facial registration algorithm.

In the foregoing embodiment, the error adjustment parameter (e.g., a set of fitting coefficients) of the current frame of image is determined by using the facial tracking information of the prior frames of images at S305. For example, locations of registration points of the current frame are fitted by using locations of registration points of N previous frames with a fitting function, to eliminate the system error as much as possible. Further, a square sum of fitting coefficients of the fitting function may be minimized on the premise of controlling a fitting error between the fitted feature points and the registered feature points of the current frame, to eliminate the random error as much as possible. By solving a problem of simultaneously minimizing the square sum of the fitting coefficients and the fitting error, the set of the fitting coefficients can be determined in some embodiments.

At S304, in one example, after the facial feature information of the current frame of image in the video and the facial tracking information of the prior frames of images in the video are obtained, the set of adjustment frames of image are selected from a subset of the prior frames of images based on the facial feature information of the current frame and the facial tracking information of the prior frames of images.

For example, Subsequent processing is performed by using the selected adjustment frames of images instead of all the prior frames of images. As a result, a data processing amount can be decreased. In addition, the adjustment frames can be frames having facial locations that change slightly relative to facial locations in the current frame compared with those unselected frames in the subset of prior frames, and thus help to reduce the system error.

The selection of adjustment frames from the subset of prior frames of images based on the facial feature information of the current frame of image and the facial tracking information of the prior frames of images may include: selecting, from the subset of prior frames, prior frames having coordinate vectors most close to that of the current frame.

For example, a video includes Y frames from first frame to the $Y^{th}$ frame. The $K^{th}$ frame of image is a current frame under processing. The set of K−1 frames of images previous to the $K^{th}$ frame are the prior frames of the current frame. The adjustment frames of image are selected from a subset of the set of K−1 prior frames. For example, the subset of K−1 prior frames includes M frames of images, in the K−1 frames of images.

For example, the subset of M frames of images may be M frames of images whose distance to the current frame of image is minimum in terms of time. For example, the video includes Y frames of images, and the Y frames of images are respectively the first frame, the second frame, . . . , the $(K-M)^{th}$ frame, . . . , the $(K-1)^{th}$ frame, the $K^{th}$ frame, . . . , and the $Y^{th}$ frame. According to the foregoing embodiment, the adjustment frame of image is selected from the $(K-M)^{th}$ frame to the $(K-1)^{th}$ frame.

In one example, a distance (e.g., distance between two coordinate vectors) between each of the M prior frames of images and the current frame of image may be determined based on facial tracking information of the M prior frames of images and the facial feature information of the current frame of image. Accordingly, N adjustment frames of images having shortest distances to the current frame of image are selected from the M prior frames of images.

In an embodiment, the calculated distance is a Euclidean distance. For example, the facial tracking information and the facial feature information record corresponding information by using vectors. A Euclidean distance between facial tracking information of each frame and the facial feature information is calculated, and N frames having the shortest Euclidean distances among the subset of M prior frames are determined to be the N adjustment frames of images.

For example, the calculated Euclidean distances can be sorted to obtain a distance sequence. The Euclidean distances may be sorted based on respective values. If the Euclidean distances are sorted in descending order based on the values, frames of images corresponding to the last N distances in the distance sequence may be selected. If the Euclidean distances are sorted in ascending order based on the values, frames of images corresponding to the first N distances in the distance sequence may be selected.

In another example, the calculated Euclidean distances can be sequentially compared in pairs to obtain N values corresponding to smallest distance values, and frames of images corresponding to the N values are determined as the adjustment frames of images.

The processing manners of determining the adjustment frames of images through sorting or comparison in pairs are merely used as examples. A selection manner is not specifically limited to those examples.

According to the foregoing embodiment, the N adjustment frames of images having the shortest distances are selected from the prior frames of images. A change of facial locations in two frames causes an error. Therefore, errors caused by the N adjustment frames of images having the shortest distances can be minimized. At S305, the adjustment parameter of the current frame of image is determined by using the selected N adjustment frames of images, so that the adjustment parameter can be accurately determined.

In the technical solution provided in step S306, the facial tracking information of the current frame of image is determined based on the adjustment parameter and the facial tracking information of the prior frames of images.

According to the foregoing embodiment, a registration result of the current frame and information provided by other frames are effectively combined, to improve both accuracy and stability of the registration result. In addition, operation complexity is low, and a single-core CPU can be used for real-time implementation in one example.

The fitting in the foregoing embodiment means that if several discrete function values of a fitting function is already known, several undetermined fitting coefficients in the fitting function are adjusted, so that a difference between a resultant value of the function derived based on the several discrete function values and a known point set is minimum.

For example, the facial tracking information of the adjustment frames of image is the several discrete function values that are already known, the facial feature information of the current frame of image is the known point set, and the adjustment parameter is the set of several undetermined coefficients. For example, a value of the adjustment parameter (e.g., values of a set of fitting coefficients) is adjusted, so that a difference between the facial tracking information of the current frame determined based on the facial tracking information of each adjustment frame of image and the facial feature information of the current frame is minimum, which has an effect of minimize the system error. In addition, the value of the adjustment parameter is adjusted in a way that satisfies another constraint that a square sum of the fitting coefficients is minimized, which has an effect to minimize the random error. Thus, an adjustment parameter leading to minimum system error and random error can be determined. Accordingly, the facial tracking information of the current frame of image that is determined by using the adjustment parameter (e.g., the set of fitting coefficients) and the respective fitting function can be accurate.

In an embodiment, the fitting of an adjustment parameter of the current frame of image based on facial tracking information of the adjustment frame of image and the facial feature information of the current frame of image includes at least one of the following:

determining, based on the facial tracking information of the set of adjustment frames of images and the facial feature information of the current frame of image, an adjustment parameter in a way that causes an error between the facial tracking information of the current frame of image and the facial feature information to be minimum; and determining, based on the facial tracking information of the adjustment frame of image and the facial feature information of the current frame of image, an adjustment parameter in a way that a quadratic sum (or square sum) of respective fitting coefficients is minimum.

An error between a registration point derived from two or more frames of images and a location of a real feature point is classified into a system error and a random error. The adjustment parameter determined according to this embodiment can be used for reducing the system error and/or the random error.

For example, the system error is an error caused by a change of facial locations in the set of frames. In the foregoing embodiment, the difference between the facial tracking information of the current frame of image and the facial feature information of the current frame of image is minimally fitted (or minimized) to control the system error.

In addition, the random error is an error caused by the facial tracking techniques disclosed herein. In the foregoing embodiment, a quadratic (or square) sum of the adjustment parameter (for example, the set of optimization (or fitting) coefficients) is minimally fitted (or minimized) to control the random error.

According to the foregoing embodiment, the fitting may be effectively implemented by using a ridge regression algorithm, so that calculation accuracy and stability can be improved, and operation complexity can be reduced. For example, the fitting of the adjustment parameter of the current frame of image based on facial tracking information of the adjustment frame of image and the facial feature information of the current frame of image includes: fitting a set of regression coefficients (or fitting coefficients) of the current frame of image by using a pre-determined function $L(q_1,L,q_N)$. The adjustment parameter includes the regression coefficients.

In one example, the function $L(q_1,L,q_N)$ has a form of:

$$L(q_1, L, q_N) = \left\| \sum_{i=1}^{N} q_i C_i - P_k \right\|_2^2 + \lambda S \sum_{i=1}^{N} q_i^2,$$

where $q_i$ represents the regression coefficient (fitting coefficient), $C_i$ represents the facial tracking information of the adjustment frame of image i, $P_K$ represents the facial feature information of the current frame of image, S is a first preset parameter, $\lambda$ is a second preset parameter, and K, i, and N are natural numbers. For example, in the fitting process, the determined regression coefficient may cause a value of $L(q_1,L,q_N)$ to be minimum. Fining a set of regression coefficients to minimize the function $L(q_1,L,q_N)$ is known as the ridge regression problem. By solving the ridge regression problem based on the set of $C_i$ and $P_K$, the set of regression coefficients can be determined.

The difference between the facial tracking information of the current frame and the facial feature information of the current frame can be minimally fitted (minimized) by using $$\left\| \sum_{i=1}^{N} q_i C_i - P_k \right\|_2^2$$

and the facial tracking information of each adjust frame, to control the system error. A quadratic sum of the regression coefficients can be minimally fitted by using $$\lambda S \sum_{i=1}^{N} q_i^2,$$

to control the random error. The location of the registration point of the current frame is fitted by using the ridge regression algorithm and the locations of the registration points of the N previous frames, to eliminate the system error as much as possible. In addition, the quadratic sum of the coefficient is minimally fitted on the premise of controlling the fitting error, to eliminate the random error as much as possible, so that the regression coefficient can be simply and quickly determined.

For example, there is a plurality of regression coefficients (or referred to as fitting coefficients). Each adjustment frame corresponds to a regression coefficient. For example, if 10 adjustment frames are selected, 10 regression coefficients are determined.

According to the foregoing embodiment of this application, the determining facial tracking information of the current frame of image based on the adjustment parameter and the facial tracking information of the prior frames of images may include: adjusting facial tracking information of each of the prior frames of images by using the respective regression coefficient; and accumulating the adjusted facial tracking information of each prior frame of image to obtain the facial tracking information $Q_k$ of the current frame of image.

For example, the facial tracking information of the current frame of image is calculated based on $$Q_k = \sum_{i=1}^{N} q_i C_i.$$

Figure 4:
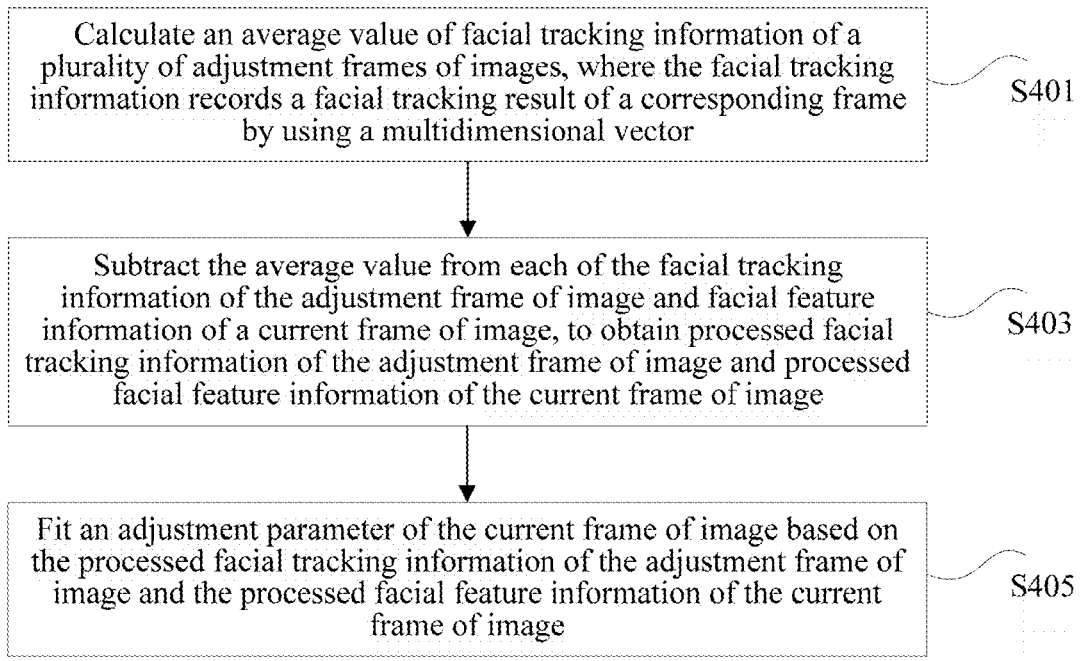
FIG. 4 is a flowchart of another facial tracking method according to an embodiment of the present disclosure.

According to the foregoing embodiment of the present disclosure, the fitting an adjustment parameter of the current frame of image based on facial tracking information of the adjustment frame of image and the facial feature information of the current frame of image may include the following steps shown in FIG. 4:

Step S401: Calculate an average value of facial tracking information of a plurality of adjustment frames of images, where the facial tracking information records a facial tracking result of a corresponding frame by using a multidimensional vector.

Step S403: Subtract the average value from each of the facial tracking information of the adjustment frame of image and the facial feature information of the current frame of image, to obtain processed facial tracking information of the adjustment frame of image and processed facial feature information of the current frame of image.

Step S405: Fit the adjustment parameter of the current frame of image based on the processed facial tracking information of the adjustment frame of image and the processed facial feature information of the current frame of image.

In this embodiment, the average value not affecting the adjustment parameter is determined before the adjustment parameter is determined, and the average value is subtracted from each of the facial tracking information of each adjustment frame of image and the facial feature information of the current frame of image. The adjustment parameter of the current frame of image is fitted by using the processed facial tracking information of the adjustment frame of image and the processed facial feature information of the current frame of image. In this example, the average value not affecting the adjustment parameter is not involved in calculation, and information that may affect the adjustment parameter is fitted. In other words, information having no impact is not involved in the fitting operation. As a result, a calculation amount can be decreased, and accuracy of a fitting result can be improved.

In the example, the adjustment parameter may be determined by using the pre-determined function in the following manner:

$$L(q_1, \square, q_N) = \left\| \sum_{i=1}^{N} q_i C_i' - P_k' \right\|_2^2 + \lambda S \sum_{i=1}^{N} q_i^2.$$

$C'_1, \ldots,$ and $C'_N$ are the facial tracking information of each adjustment frame from which the average value $\overline{C}$ is subtracted, and $P'_k$ is the facial feature information of the current frame from which the average value $\overline{C}$ is subtracted.

Further, it is noted that the first preset parameter and the second preset parameter may be predetermined constants, or may be preset based on characteristics of the video. For example, the first preset parameter S and the second preset parameter $\lambda$ may be preset before the adjustment parameter of the current frame of image is fitted by using the facial tracking information of the adjustment frame of image and the facial feature information of the current frame of image.

For example, a coordinate scale (or range) of the feature points in the facial feature information of the current frame of image is obtained, and the first preset parameter S is set based on the coordinate scale of the feature points.

For example, the setting the first preset parameter S based on the coordinate scale of the feature points includes: selecting a larger coordinate scale from a horizontal coordinate scale and a vertical coordinate scale of the feature points of the current frame; and determining that the square of the selected coordinate scale is the first preset parameter S.

The coordinate scale may be a spatial range used for measuring the horizontal coordinate and the vertical coordinate of the feature points. For example, the scale may be a counting unit on a coordinate axis, and a horizontal coordinate scale and a vertical coordinate scale in a same coordinate system may be the same or may be different.

In an embodiment, if the horizontal coordinate scale and the vertical coordinate scale are different, the coordinate scale having a larger value may be selected from the two coordinate scales, and the first preset parameter is determined based on the coordinate scale whose value is larger. Optionally, the square of the coordinate scale whose value is larger may be used as the first preset parameter. Alternatively, an integer multiple of the square of the coordinate scale whose value is larger may be used as the first preset parameter S.

According to the foregoing embodiment, a value of the second preset parameter $\lambda$ may be set at least based on a change degree of recorded content in the video before the adjustment parameter of the current frame of image is fitted based on the facial tracking information of the adjustment frame of image and the facial feature information of the current frame of image.

For example, the setting a value of the second preset parameter $\lambda$ at least based on a change degree (or variance) of recorded content in the video may include: increasing the value of the second preset parameter $\lambda$ based on a default value if the change degree of the recorded content in the video is greater than a first pre-determined threshold, to set the value of the second preset parameter $\lambda$; or decreasing the value of the second preset parameter $\lambda$ based on a default value if the change degree of the recorded content in the video is less than a second pre-determined threshold, to set the value of the second preset parameter $\lambda$.

In this embodiment, the default value of the second preset parameter may be preset, and the value of the second preset parameter $\lambda$ may be set by adjusting the default value.

For example, the change degree (or variance) of the recorded content in the video can be determined based on certain metrics. The change degree may indicate change severity of the recorded content in the video. If the change is severe, the change degree is high. If the change is gentle, the change degree is low. In this embodiment, the change degree may be quantized. If the change degree of the recorded content in the video is greater than the first pre-determined threshold, the default value of the second preset parameter $\lambda$ is increased to set the value of the second preset parameter $\lambda$. If the change degree of the recorded content in the video is less than the second pre-determined value, the default value is decreased to set the value of the second preset parameter $\lambda$.

In one example, the value of the second preset parameter $\lambda$ is set based on accuracy of the facial registration algorithm (e.g., the facial tracking techniques or methods disclosed herein). If the accuracy of the facial registration algorithm is greater than first pre-determined accuracy, the default value of the second preset parameter $\lambda$ is decreased. If the accuracy of the facial registration algorithm is less than second pre-determined accuracy, the default value of the second preset parameter $\lambda$ is increased.

In the foregoing embodiment, if the accuracy of the facial registration algorithm is greater than the first pre-determined accuracy, it is determined that the random error is relatively small, and optimization of the system error is more important. Therefore, $\lambda$ is relatively small. Otherwise, if the accuracy of the facial registration algorithm is lower, $\lambda$ can be relatively large. In an actual application, an initial value of $\lambda$ may be set to 1, and $\lambda$ is adjusted to an appropriate value according to the foregoing principle based on expression of the facial registration algorithm on the video.

In one example, the value of the second preset parameter $\lambda$ is set based on accuracy of the facial registration algorithm and the change degree of the recorded content in the video.

Weights of the accuracy of the facial registration algorithm and the change degree of the recorded content in the video are set, the accuracy of the facial registration algorithm and the change degree of the recorded content in the video are normalized, and weighting calculation is performed by using the set weight on the accuracy and the change degree that are obtained through normalization. If a value obtained through the weighting calculation belongs to a first preset interval, the default value of the second preset parameter is increased. If a value obtained through the weighting calculation belongs to a second preset interval, the value of the second preset parameter is set to be the default value of the second preset parameter. If a value obtained through the weighting calculation belongs to a third preset interval, the default value of the second preset parameter is decreased.

The first preset interval, the second preset interval, and the third preset interval are consecutive intervals. Endpoints of the three preset intervals may be adjusted based on accuracy and stability of a facial tracking algorithm. Optionally, a left endpoint of the first preset interval is the smallest or largest value in six interval endpoints.

In an optional embodiment, the determining facial tracking information of the current frame of image based on the adjustment parameter and the facial tracking information of the prior frames of images may include: determining the facial tracking information $Q_k$ of the current frame of image by using the following formula:

$$Q_k = \sum_{i=1}^{N} q_i C_i' + \overline{C},$$

where $q_i$ represents the adjustment parameter, $C_i'$ represents the processed facial tracking information of the adjustment frame of image, and $\overline{C}$ represents the average value.

An embodiment is described in detail below with reference to FIG. 5 and by using an example in which a $K^{th}$ frame of image in a video is used as the current frame of image, and the 1st to the $(K-1)^{th}$ frames of the video are prior frames of the current frame. In one example, the following steps are applied to frames from the first frame to the last frame in the video sequentially. In the example, results (to be specific, the foregoing facial feature information obtained from a facial registration process performed over each frame), denoted as $P_1, \ldots,$ and $P_K$, of facial registration points of the first frame to the $K^{th}$ frame are already obtained, and results (to be specific, the foregoing facial tracking information determined by using the facial tracking techniques disclosed herein), denoted as $Q_1, \ldots,$ and $Q_{k-1}$, of the tracked facial registration points of the first frame to the $(K-1)^{th}$ frame are already known. In one example, there are 90 pre-defined facial feature points, all $P_i$ and $Q_1$ may be 180-dimensional vectors (where each feature point includes two vectors: a horizontal vector and a vertical vector), including horizontal coordinates and vertical coordinates of 90 key points.

Figure 5:
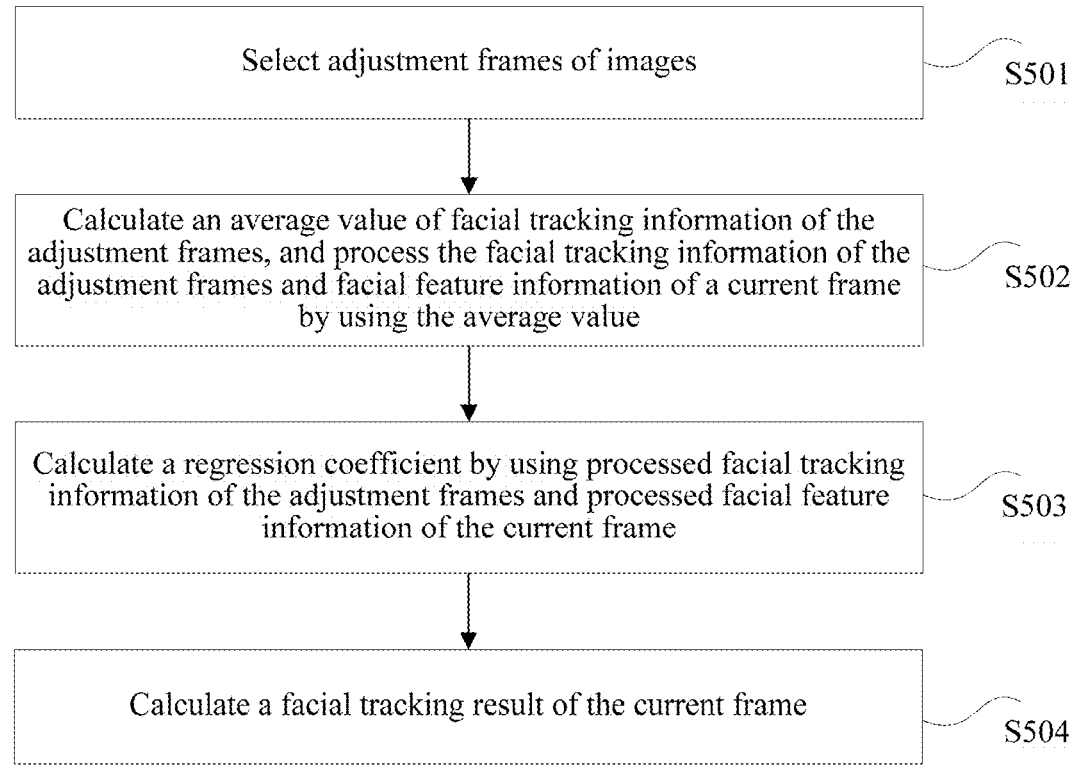
FIG. 5 is a flowchart of still another facial tracking method according to an embodiment of the present disclosure.

As shown in FIG. 5, this embodiment may be implemented by using the following steps:

Step S501: Select adjustment frames of images.

For example, M frames are selected from the K-1 prior frames. For example, the M frames can be the frames closest to the current frame in time, or any M frames selected from the K-1 prior frames. Then, the M frames are evaluated to select N adjustment frames. In one example, N frames having shortest Euclidean distances to the current frame of image $P_k$ are selected from the following M frames of images: $(K-M)^{th}$ frame of image to $(K-1)^{th}$ frame of image, and facial tracking information of the N adjustment frames is denoted as $C_1, \ldots,$ and $C_N$. For example, M may be 50, and N may be 10 in one embodiment. This is not limited in this application. It is noted that in different embodiments, the N adjustment frames may be obtained in various ways that are different from the above examples. For example, frames closest to the current frames to the current frames in time can be used as the adjustment frames without any evaluation. The M frames may include frames that are not the closest frames to the current frame in time. Selection of the N frames from the M frames may be based on criteria other than the Euclidean distances. In addition, in some examples, the sequence of K frames are not video frames, or are frames that are selected from a video but are not adjacent to each other in time, or are arranged in an order different from the respective display order. In those examples, the sequence of K frames may be processed in any order. For example, a current frame can be a $J^{th}$ frame where 0<J<K, and the frames used as adjustment frames can be in front of or after the current frame in the sequence of K frames.

Further, in one example, when there are subscripts less than 1, all the subscripts are replaced with 1. For example, obtained $Q_{-1}$ is replaced with the value of $Q_1$. For example, if the second frame is used as the current frame, K-1 is 1, K-M=K-50=-49, and all $Q_i$ is replaced with the value of $Q_i$.

Step S502: Calculate an average value of facial tracking information of the adjustment frames, and process the facial tracking information of the adjustment frames and the facial feature information of the current frame by using the average value.

For example, the average value $\overline{C}$ of $C_1, \ldots,$ and $C_N$ are calculated, $\overline{C}$ is subtracted from each of $C_1, \ldots, C_N$, and $P_k$, and calculation results are respectively denoted as $C'_1, \ldots, C'_N$, and $P'_k$.

Step S503: Calculate a regression coefficient by using processed facial tracking information of the adjustment frames and processed facial feature information of the current frame.

For example, a set of regression coefficients can be determined by solving a ridge regression optimization problem of finding a set of regression coefficients that minimizes a value of $$L(q_1, \square, q_N) = \left\| \sum_{i=1}^{N} q_i C_i' - P_k' \right\|_2^2 + \lambda S \sum_{i=1}^{N} q_i^2.$$

In one example, S is a value directly proportional to the square of a scale (to be specific, the coordinate scale in the foregoing embodiment) of $P_k$. For example, the square of the larger one of a horizontal coordinate span (to be specific, the horizontal coordinate scale in the foregoing embodiment) and a vertical coordinate span (to be specific, the vertical coordinate scale in the foregoing embodiment) of $P_k$ is used as a value of S, and $\lambda$ may be a set parameter.

A selection principle of $\lambda$ is as follows: The parameter mainly controls weights of optimization of the system error and optimization of the random error in the to-be-optimized problem. If a video change is severe, the system error is relatively large, and the former one in the to-be-optimized problems is more important. Therefore, $\lambda$ can be relatively small. Otherwise, if a video change is gentle, $\lambda$ can be relatively large. On the other hand, if accuracy of a facial registration algorithm is relatively high, the random error is relatively small, and the former one in the to-be-optimized problems is more important. Therefore, $\lambda$ is relatively small. Otherwise, if accuracy of a facial registration algorithm is relatively low, $\lambda$ can be relatively large. In an actual application, an initial value of $\lambda$ may be set to 1, and $\lambda$ is adjusted to an appropriate value according to the foregoing principle based on actual expression of the algorithm on the video.

In the foregoing embodiment, a difference between a facial tracking result of the current frame and the facial registration result $P_k$ (namely, the facial feature information) of the current frame is minimally fitted by using the first item $$\left\| \sum_{i=1}^{N} q_i C_i' - P_k' \right\|_2^2,$$

to control the system error. A quadratic sum of a coefficient is minimally fitted by using the second item $$\lambda s \sum_{i=1}^{N} q_i^2,$$

to control the random error. The regression coefficients can be solved by solving the foregoing ridge regression problem.

Step S504: Calculate a facial tracking result of the current frame.

Optionally, after the results of regression coefficients $q_1, \ldots,$ and $q_N$ are calculated, $Q_k$ may be calculated by using the following formula:

$$Q_k = \sum_{i=1}^{N} q_i C_i' + \overline{C}.$$

According to the foregoing embodiment, the facial registration point in the video is tracked by using a ridge regression method, to satisfy requirements on stability, accuracy, and high-speed real-time calculation.

It is further noted that in an optional embodiment, results $P_i$ and $Q_i$ of the registration points of the current frame may be classified into a plurality of groups. Each group is independently tracked or processed by selecting different $\lambda$ based on a corresponding characteristics of the respective frames, and obtained results (facial tracking information) of each group are combined into an integral tracking result.

Specifically, the setting a value of the second preset parameter $\lambda$ at least based on a change degree of recorded content in the video includes: classifying the facial tracking information of the adjustment frame of image and the facial feature information of the current frame of image into a plurality of groups of information; and setting a value of the second preset parameter $\lambda$ of each group of information based on the change degree of the recorded content in the video. Values of the second preset parameter that correspond to at least two groups of information can be different.

Optionally, each group of information includes the facial feature information of the current frame and facial tracking information of some adjustment frames of images. For example, grouping is performed based on the change degree of the recorded content in the video. Alternatively, grouping is performed based on the Euclidean distance between the facial tracking information of the adjustment frame of image and the facial feature information of the current frame of image.

Optionally, the second preset parameter $\lambda$ set for different groups may be different, and the grouping may be performed based on the change degree of the recorded content in the video. For example, the grouping is performed based on a turning point of change severity of the recorded content in the video. Alternatively, the grouping is performed based on the Euclidean distance between the facial tracking information of the adjustment frame of image and the facial feature information of the current frame of image. Further, a distance interval is preset, and adjustment frames corresponding to Euclidean distances belonging to a same preset distance interval are classified into one group.

Optionally, each group of information includes some facial feature information of the current frame and some facial tracking information of each adjustment frame of image. For example, information of each frame is classified based on facial areas obtained through pre-division. For example, if an area of a face is pre-divided into five areas, the facial tracking information of the adjustment frame of image and the facial feature information of the current frame of image may be classified into five groups of information, and each group of information corresponds to an area.

According to the foregoing embodiment, the operations of fitting an adjustment parameter of the current frame of image based on facial tracking information of the adjustment frame of image and the facial feature information of the current frame of image and determining facial tracking information of the current frame of image based on the adjustment parameter and the facial tracking information of the adjustment frame (where in the example, facial tracking information corresponding to each group of information is determined based on an adjustment parameter of the group and the facial tracking information of the adjustment frame) are performed on each group. After group facial tracking information of each group is obtained, group tracking information corresponding to each group is integrated to obtain the facial tracking information of the current frame.

According to the foregoing embodiment, the facial tracking result of the current frame can be more accurately determined.

It is noted that for each of the foregoing method embodiments, for ease of description, the method embodiment is described as a series of action combinations, but persons skilled in the art should learn that the present disclosure is not limited to an order of described actions because according to the present disclosure, some steps may be performed in another order or at the same time. In addition, persons skilled in the art should also know that the related actions and modules are not necessarily required in some embodiments.

According to the descriptions in the foregoing implementations, persons skilled in the art may clearly learn that the method according to the foregoing embodiment may be implemented by relying on software and a commodity hardware platform or by using hardware. Based on the understanding, the technical solutions of the present disclosure, or the part contributing to the related technology, may essentially be presented in the form of a software product. The computer software product is stored in a storage medium (for example, a ROM/RAM, a magnetic disk, or an optical disc) including several instructions to enable a terminal device (which may be a mobile phone, a computer, a server, a network device, or the like) to perform the methods described in the embodiments of the present disclosure.

Figure 6:
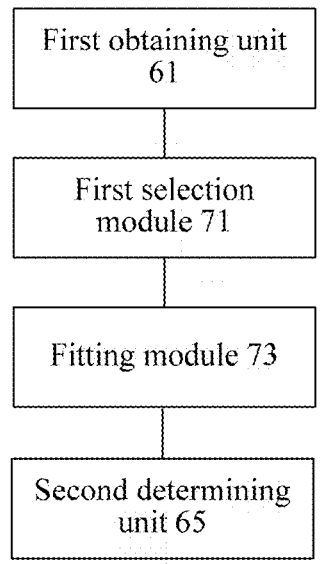
FIG. 6 is a schematic diagram of a facial tracking apparatus according to an embodiment of the present disclosure.

According to an embodiment of the present disclosure, a facial tracking apparatus configured to implement the foregoing facial tracking method is further provided. FIG. 6 is a schematic diagram of an optional facial tracking apparatus according to an embodiment of the present disclosure. As shown in FIG. 6, the method may include:

a first obtaining unit 61, configured to obtain facial feature information of a current frame of image in a video and optionally facial tracking information of prior frames of images in the video, the prior frames of images being frames of images located previous to the current frame of image in the video, the facial feature information recording information about facial feature points in the current frame of image, and the facial tracking information being used for recording facial tracking results of the prior frames of images;

a first selection module 71, configured to select a set of adjustment frames of images from the prior frames of images based on the facial feature information of the current frame of image and the facial tracking information of the prior frames of images;

a fitting module 73, configured to fit an adjustment parameter of the current frame of image based on facial tracking information of the adjustment frames of images and the facial feature information of the current frame of image; and a second determining unit 65, configured to determine facial tracking information of the current frame of image based on the adjustment parameter and the facial tracking information of the prior frames of images.

Figure 7:
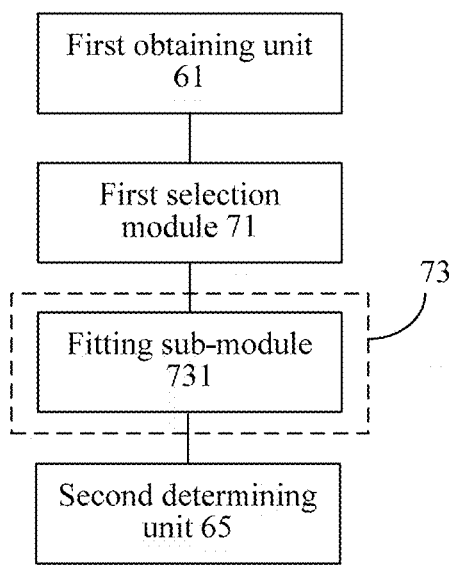
FIG. 7 is a schematic diagram of another facial tracking apparatus according to an embodiment of the present disclosure.

For example, the fitting module includes: a first fitting sub-module 731 shown in FIG. 7, configured to determine, based on the facial tracking information of the adjustment frame of image and the facial feature information of the current frame of image, an adjustment parameter causing an error between the facial tracking information of the current frame of image and the facial feature information to be minimum; and a second fitting sub-module, configured to determine, based on the facial tracking information of the adjustment frame of image and the facial feature information of the current frame of image, an adjustment parameter whose quadratic sum is minimum.

Optionally, the fitting module includes a third fitting sub-module, configured to fit regression coefficients of the current frame of image by using a pre-determined function $$L(q_1, L, q_N) = \left\| \sum_{i=1}^{N} q_i C_i - P_k \right\|_2^2 + \lambda S \sum_{i=1}^{N} q_i^2,$$

where $q_i$ represents the regression coefficient, $C_i$ represents the facial tracking information of the adjustment frame of image i, $P_K$ represents the facial feature information of the current frame of image, S is a first preset parameter, $\lambda$ is a second preset parameter, and K, i, and N are natural numbers.

Optionally, the apparatus further includes a second obtaining unit, configured to obtain a coordinate scale of the feature points in the facial feature information of the current frame of image before the adjustment parameter of the current frame of image is fitted based on the facial tracking information of the adjustment frame of image and the facial feature information of the current frame of image; and a first setting unit, configured to set the first preset parameter S based on the coordinate scale of the feature points.

Optionally, the first setting unit includes: a second selection module, configured to select a coordinate scale whose value is larger from a horizontal coordinate scale and a vertical coordinate scale of the feature point; and a first determining module, configured to determine that the square of the selected coordinate scale whose value is larger is the first preset parameter S.

Optionally, the apparatus further includes a second setting unit, configured to set a value of the second preset parameter $\lambda$ at least based on a change degree of recorded content in the video before the adjustment parameter of the current frame of image is fitted based on the facial tracking information of the adjustment frame of image and the facial feature information of the current frame of image.

Optionally, the second setting unit includes: a first adjustment module, configured to increase the value of the second preset parameter $\lambda$ based on a default value if the change degree of the recorded content in the video is greater than a first pre-determined threshold, to set the value of the second preset parameter $\lambda$; and a second adjustment module, configured to decrease the value of the second preset parameter $\lambda$ based on a default value if the change degree of the recorded content in the video is less than a second pre-determined threshold, to set the value of the second preset parameter $\lambda$.

Optionally, the second setting unit includes: a grouping module, configured to classify the facial tracking information of the adjustment frame of image and the facial feature information of the current frame of image into a plurality of groups of information; and a first setting module, configured to set a value of the second preset parameter $\lambda$ of each group of information based on the change degree of the recorded content in the video. Values of the second preset parameter that correspond to at least two groups of information are different. The fitting module includes a fourth fitting sub-module, configured to fit an adjustment parameter of each group of information. The second determining unit includes a second determining module, configured to determine group tracking information corresponding to each group of information, and integrate the group tracking information corresponding to each group to obtain the facial tracking information of the current frame.

Optionally, the fitting module includes: a first calculation sub-module, configured to calculate an average value of facial tracking information of a plurality of adjustment frames of images, where the facial tracking information records a facial tracking result of a corresponding frame by using a multidimensional vector; a second calculation sub-module, configured to subtract the average value from each of the facial tracking information of the adjustment frame of image and the facial feature information of the current frame of image, to obtain processed facial tracking information of the adjustment frame of image and processed facial feature information of the current frame of image; and a fifth fitting sub-module, configured to fit the adjustment parameter of the current frame of image based on the processed facial tracking information of the adjustment frame of image and the processed facial feature information of the current frame of image.

Optionally, the first selection module includes: a first obtaining sub-module, configured to obtain, from the prior frames of images, M prior frames of images whose time is closest to that of the current frame of image; a first determining sub-module, configured to determine a distance between each of the M prior frames of images and the current frame of image based on facial tracking information of the M prior frames of images and the facial feature information of the current frame of image; and a selection sub-module, configured to select, from the M prior frames of images, N adjustment frames of images whose distance to the current frame of image is minimum.

Optionally, the second determining unit includes: an adjustment module, configured to adjust facial tracking information of each of the prior frames of images by using the adjustment parameter; and an accumulation module, configured to accumulate the facial tracking information of each prior frame of image to obtain the facial tracking information of the current frame of image.

Optionally, the second determining unit includes a third determining module, configured to determine the facial tracking information $Q_k$ of the current frame of image by using the following formula. The formula is $$Q_k = \sum_{i=1}^{N} q_i C_i' + \overline{C},$$

$q_i$ represents the adjustment parameter, $C_i'$ represents the processed facial tracking information of the adjustment frame of image, and $\overline{C}$ represents the average value.

According to the foregoing embodiment, the adjustment parameter used for decreasing the error of the facial tracking information of the current frame of image is determined based on the facial feature information of the current frame of image and the facial tracking information of the prior frames of images, and the facial tracking information of the current frame of image can be accurately determined by using the adjustment parameter. According to the foregoing embodiment, the adjustment parameter is determined based on information about the prior frames of images rather than information about a subsequent frame of image, so that no delay is generated, and real-time performance can be ensured. In addition, in the solution, no complex anti jitter rule needs to be configured, and therefore a manner of obtaining tracking information is simple. Further, in the solution, the accurate facial tracking information can be determined without annotating massive training samples, thereby resolving a problem that it is difficult to ensure both high accuracy and low complexity by using a facial registration point tracking algorithm in the related technology, and ensuring high accuracy of the facial tracking information in a simple processing manner.

It is noted herein that examples and application scenarios in which the foregoing modules and corresponding steps are implemented are the same, but are not limited to the content disclosed in the foregoing embodiments. It is noted that the foregoing modules, as a part of the apparatus, may run in the hardware environment shown in FIG. 2, and may be implemented by using software or by using hardware. The hardware environment includes a network environment.

According to an embodiment of the present disclosure, an electronic device configured to implement the foregoing facial tracking method is further provided.

Figure 8:
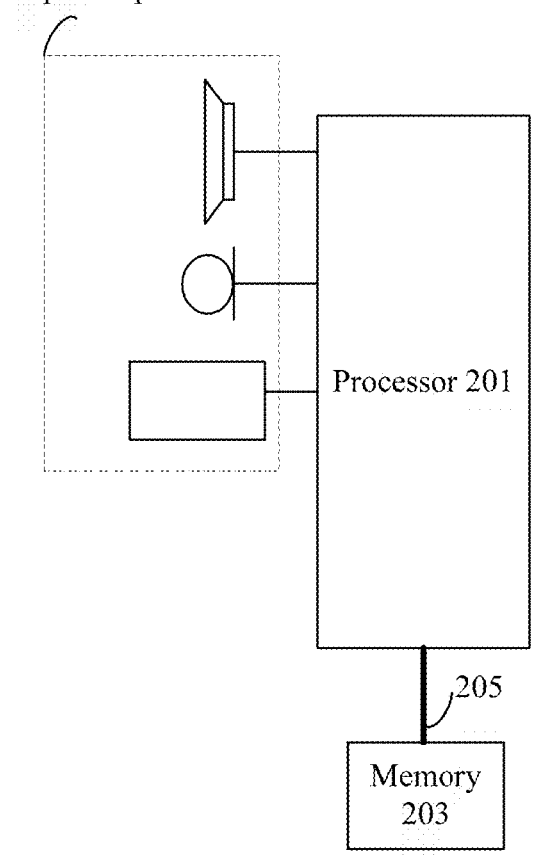
FIG. 8 is a structural block diagram of an electronic device according to an embodiment of the present disclosure.

FIG. 8 is a structural block diagram of an electronic device according to an embodiment of the present disclosure. As shown in FIG. 8, the electronic device may include: processing circuitry such as one or more (where only one is shown) processors 201, a memory 203, and a transmission apparatus 205. As shown in FIG. 8, the electronic device may further include an input/output device 207.

The memory 203 may be configured to store software programs and modules, for example, program instructions/modules corresponding to the facial tracking method and apparatus in the embodiments of the present disclosure. The processor 201 is configured to run the software programs and modules stored in the memory 203, to perform various functional applications and data processing, to be specific, implement the foregoing facial tracking method. The memory 203 may include a non-transitory memory, such as a high-speed random memory, and a non-volatile memory such as one or more magnetic storage apparatuses, a flash, or another non-volatile solid-state memory. In some examples, the memory 203 may further include memories remotely disposed relative to the processor 201, and these remote memories may be connected to a terminal through a network. Instances of the network include, but are not limited to, the Internet, an intranet, a local area network, a mobile communications network, and a combination thereof.

The transmission apparatus 205 is configured to receive or send data through a network, and may further be used for data transmission between the processor and the memory. Specific instances of the foregoing network may include a wired network and a wireless network. In an example, the transmission apparatus 205 includes a network interface controller (NIC). The NIC may be connected to another network device and a router by using a network cable, so as to communicate with the Internet or the local network. In an example, the transmission apparatus 205 is a radio frequency (RF) module, and is configured to wirelessly communicate with the Internet.

Specifically, the memory 203 is configured to store an application program.

The processor 201 may be configured to invoke, by using the transmission apparatus 205, the application program stored in the memory 203, to perform the following steps: obtaining facial feature information of a current frame of image in a video and facial tracking information of prior frames of images in the video, the prior frames of images being frames of images located previous to the current frame of image in the video, the facial feature information recording information about facial feature points in the current frame of image, and the facial tracking information being used for recording facial tracking results of the prior frames of images; selecting a set of adjustment frames of images from the prior frames of images based on the facial feature information of the current frame of image and the facial tracking information of the prior frames of images; fitting an adjustment parameter of the current frame of image based on facial tracking information of the adjustment frames of images and the facial feature information of the current frame of image; and determining facial tracking information of the current frame of image based on the adjustment parameter and the facial tracking information of the prior frames of images.

The processor 201 is further configured to perform at least one of the following steps: determining, based on the facial tracking information of the adjustment frames of images and the facial feature information of the current frame of image, an adjustment parameter causing an error between the facial tracking information of the current frame of image and the facial feature information to be minimum; and determining, based on the facial tracking information of the adjustment frame of image and the facial feature information of the current frame of image, an adjustment parameter whose quadratic sum is minimum, to fit the adjustment parameter of the current frame of image based on the facial tracking information of the adjustment frame of image and the facial feature information of the current frame of image.

The processor 201 is further configured to perform the following steps: fitting a set of regression coefficients of the current frame of image by using a pre-determined function $L(q_1,L,q_N)$, to fit the adjustment parameter of the current frame of image based on the facial tracking information of the adjustment frames of images and the facial feature information of the current frame of image. The adjustment parameter includes the regression coefficients, $$L(q_1, L, q_N) = \left\| \sum_{i=1}^{N} q_i C_i - P_k \right\|_2^2 + \lambda S \sum_{i=1}^{N} q_i^2,$$

$q_i$ represents the regression coefficient, $C_i$ represents the facial tracking information of the adjustment frame of image i, $P_K$ represents the facial feature information of the current frame of image, S is a first preset parameter, $\lambda$ is a second preset parameter, and K, i, and N are natural numbers.

The processor 201 is further configured to perform the following steps: before the fitting an adjustment parameter of the current frame of image based on facial tracking information of the adjustment frame of image and the facial feature information of the current frame of image, obtaining a coordinate scale of the feature points in the facial feature information of the current frame of image; and setting the first preset parameter S based on the coordinate scale of the feature point.

The processor 201 is further configured to perform the following steps: selecting a coordinate scale whose value is larger from a horizontal coordinate scale and a vertical coordinate scale of the feature point; and determining that the square of the selected coordinate scale whose value is larger is the first preset parameter S, to determine the first preset parameter S based on the coordinate scale of the feature point.

The processor 201 is further configured to perform the following steps: before the fitting an adjustment parameter of the current frame of image based on facial tracking information of the adjustment frame of image and the facial feature information of the current frame of image, setting a value of the second preset parameter $\lambda$ at least based on a change degree of recorded content in the video.

The processor 201 is further configured to perform the following steps: increasing the value of the second preset parameter $\lambda$ based on a default value if the change degree of the recorded content in the video is greater than a first pre-determined threshold, to set the value of the second preset parameter $\lambda$; or decreasing the value of the second preset parameter $\lambda$ based on a default value if the change degree of the recorded content in the video is less than a second pre-determined threshold, to set the value of the second preset parameter $\lambda$.

The processor 201 is further configured to perform the following steps: classifying the facial tracking information of the adjustment frame of image and the facial feature information of the current frame of image into a plurality of groups of information; and setting a value of the second preset parameter $\lambda$ of each group of information based on the change degree of the recorded content in the video, where values of the second preset parameter that correspond to at least two groups of information are different, to set the value of the second preset parameter $\lambda$ at least based on the change degree of the recorded content in the video; fitting an adjustment parameter of each group of information, to fit the adjustment parameter of the current frame of image based on the facial tracking information of the adjustment frame of image and the facial feature information of the current frame of image; and determining group tracking information corresponding to each group of information, and integrating the group tracking information corresponding to each group to obtain the facial tracking information of the current frame, to determine the facial tracking information of the current frame of image.

The processor 201 is further configured to perform the following steps: calculating an average value of facial tracking information of a plurality of adjustment frames of images, where the facial tracking information records a facial tracking result of a corresponding frame by using a multidimensional vector; subtracting the average value from each of the facial tracking information of the adjustment frame of image and the facial feature information of the current frame of image, to obtain processed facial tracking information of the adjustment frame of image and processed facial feature information of the current frame of image; and fitting the adjustment parameter of the current frame of image based on the processed facial tracking information of the adjustment frame of image and the processed facial feature information of the current frame of image, to fit the adjustment parameter of the current frame of image based on the facial tracking information of the adjustment frame of image and the facial feature information of the current frame of image.

The processor 201 is further configured to perform the following steps: obtaining, from the prior frames of images, M prior frames of images whose time is closest to that of the current frame of image; determining a distance between each of the M prior frames of images and the current frame of image based on facial tracking information of the M prior frames of images and the facial feature information of the current frame of image; and selecting, from the M prior frames of images, N adjustment frames of images whose distance to the current frame of image is minimum, to select the adjustment frame of image from the prior frames of images based on the facial feature information of the current frame of image and the facial tracking information of the prior frames of images.

The processor 201 is further configured to perform the following steps: adjusting facial tracking information of each of the prior frames of images by using the adjustment parameter; and accumulating the facial tracking information of each prior frame of image to obtain the facial tracking information of the current frame of image, to determine the facial tracking information of the current frame of image based on the adjustment parameter and the facial tracking information of the prior frame of image.

The processor 201 is further configured to perform the following steps: determining the facial tracking information $Q_k$ of the current frame of image by using the following formula, to determine the facial tracking information of the current frame of image based on the adjustment parameter and the facial tracking information of the prior frames of images. The formula is $$Q_k = \sum_{i=1}^{N} q_i C_i' + \overline{C},$$

$q_i$ represents the adjustment parameter, $C_i'$ represents the processed facial tracking information of the adjustment frame of image, and $\overline{C}$ represents the average value.

According to the foregoing embodiment, the adjustment parameter used for decreasing the error of the facial tracking information of the current frame of image is determined based on the facial feature information of the current frame of image and the facial tracking information of the prior frames of images, and the facial tracking information of the current frame of image can be accurately determined by using the adjustment parameter. According to the foregoing embodiment, the adjustment parameter is determined based on information about the prior frames of images rather than information about a subsequent frame of image, so that no delay is generated, and real-time performance can be ensured. In addition, in the solution, no complex anti jitter rule needs to be configured, and therefore a manner of obtaining tracking information is simple. Further, in the solution, the accurate facial tracking information can be determined without annotating massive training samples, thereby resolving a problem that it is difficult to ensure both high accuracy and low complexity by using a facial registration point tracking algorithm in the related technology, and ensuring high accuracy of the facial tracking information in a simple processing manner.

Optionally, for a specific example in this embodiment, refer to the examples described in the foregoing embodiments, and details are not described in this embodiment again.

Persons of ordinary skill in the art may understand that, the structure shown in FIG. 8 is only schematic. The electronic device may be a terminal device such as a smartphone (such as an Android mobile phone or an iOS mobile phone), a tablet computer, a palmtop computer, a mobile Internet device (MID), or a PAD. FIG. 8 does not limit the structure of the foregoing electronic device. For example, the electronic device may further include more or less components (such as a network interface and a display apparatus) than those shown in FIG. 8, or have configuration different from that shown in FIG. 8.

Persons of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

An embodiment of the present disclosure further provides a storage medium. Optionally, in this embodiment, the storage medium stores a computer program. The computer program, when run, is configured to perform the facial tracking method.

Optionally, in this embodiment, the storage medium may be located in at least one of a plurality of network devices in a network shown in the foregoing embodiment.

Optionally, in this embodiment, the storage medium is configured to store program code used for performing the following steps:

A processor 201 may be configured to invoke, by using a transmission apparatus 205, an application program stored in a memory 203, to perform the following steps: obtaining facial feature information of a current frame of image in a video and facial tracking information of prior frames of images in the video, the prior frames of images being frames of images located previous to the current frame of image in the video, the facial feature information recording information about facial feature points in the current frame of image, and the facial tracking information being used for recording facial tracking results of the prior frames of images; selecting a set of adjustment frames of images from the prior frames of images based on the facial feature information of the current frame of image and the facial tracking information of the prior frames of images; fitting an adjustment parameter of the current frame of image based on facial tracking information of the adjustment frames of images and the facial feature information of the current frame of image; and determining facial tracking information of the current frame of image based on the adjustment parameter and the facial tracking information of the prior frames of images.

Optionally, in this embodiment, the storage medium is configured to store program code used for performing the following steps: selecting the adjustment frame of image from the prior frames of images based on the facial feature information of the current frame of image and the facial tracking information of the prior frames of images; and fitting the adjustment parameter of the current frame of image based on the facial tracking information of the adjustment frame of image and the facial feature information of the current frame of image, to determine the adjustment parameter of the current frame of image based on the facial feature information of the current frame of image and the facial tracking information of the prior frames of images.

Optionally, for a specific example in this embodiment, refer to the examples described in the foregoing embodiments, and details are not described in this embodiment again.

Optionally, in this embodiment, the storage medium may include, but is not limited to, various media such as a USB flash drive, a ROM, a RAM, a removable hard disk, a magnetic disk, and an optical disc that can store the program code.

The sequence numbers of the foregoing embodiments of the present disclosure are merely for the convenience of description, and do not imply the preference among the embodiments.

When the integrated unit in the foregoing embodiments is implemented in the form of a software function unit and sold or used as an independent product, the integrated unit may be stored in the foregoing computer-readable storage medium. Based on such an understanding, the technical solutions of the present disclosure, or the part contributing to the related technology, or all or some of the technical solutions may essentially be presented in the form of a software product. The computer software product is stored in the storage medium, and includes several instructions for instructing one or more computer devices (which may be a personal computer, a server, a network device, or the like) to perform all or some of the steps of the methods described in the embodiments of the present disclosure.

In the foregoing embodiments of the present disclosure, the descriptions of the embodiments have their respective focuses. For a part that is not described in detail in an embodiment, refer to related descriptions in other embodiments.

In the several embodiments provided in this application, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software functional unit.

The foregoing descriptions are exemplary implementations of the present disclosure. It is noted that persons of ordinary skill in the art may make some improvements and polishing without departing from the principle of the present disclosure and the improvements and polishing shall fall within the protection scope of the present disclosure.

What is claimed is:

1. A method, comprising:
receiving, by processing circuitry, a first vector of a first frame in a video, and second vectors of a first set of second frames that are prior to the first frame in the video, the first vector formed by coordinates of first facial feature points in the first frame and determined based on a facial registration method performed over the first frame, each second vector of the second vectors of the first set of second frames is formed by coordinates of second facial feature points in the respective second frame;
determining, by the processing circuitry, a second vector of the first frame according to a fitting function, the fitting function specifying a relationship between the second vector of the first frame and the second vectors of the first set of second frames, the fitting function having a set of coefficients determined by minimizing a function including
a first component based on
(i) the second vectors of the first set of second frames from which an average of the second vectors of the first set of second frames is subtracted and
(ii) the first vector of the first frame from which the average of the second vectors of the first set of second frames is subtracted, and
a second component based on a square sum of the coefficients; and
outputting a facial tracking result of the first frame based on the determined second vector of the first frame.

2. The method of claim 1, further comprising:
selecting a second set of second frames that are nearest to the first frame according to a display order among a third set of second frames that are prior to the first frame and have second vectors; and
selecting the first set of second frames the second vectors of which having shortest Euclidean distances to the first vector of the first frame among the second set of second frames.

3. The method of claim 1, further comprising:
determining the set of coefficients by minimizing the following function:

$$L(q_1, \ldots, q_N) = \left\| \sum_{i=1}^{N} q_i C'_i - P'_k \right\|_2^2 + \lambda S \sum_{i=1}^{N} q_i^2,$$

where N represents a number of the first set of second frames, $q_i$ represents one of the set of coefficients, $C'_i$ represents one of the second vectors of the first set of second frames from which the average of the second vectors of the first set of second frames is subtracted, $P'_k$ represents the first vector of the first frame from which the average of the second vectors of the first set of second frames is subtracted, S represents a first parameter, and $\lambda$ represents a second parameter.

4. The method of claim 3, further comprising:
determining the first parameter S based on a range of vertical or horizontal coordinates of the first vector of the first frame.

5. The method of claim 4, further comprising:
determining the first parameter S to be a value proportional to a larger range among the range of the vertical coordinates and the range of the horizontal coordinates of the first vector of the first frame.

6. The method of claim 3, further comprising:
adjusting the second parameter $\lambda$ based on a variance of content of frames in the video.

7. The method of claim 3, further comprising:
increasing the second parameter $\lambda$ when a variance of content of frames in the video is above a first threshold; or
decreasing the second parameter $\lambda$ when the variance of content of frames in the video is below a second threshold.

8. The method of claim 1, wherein the first and second facial feature points of the first or second frames of the video include points distributed in areas of a lower-jaw profile, a left eye, a left eyebrow, a right eyebrow, a right eye, a nose, and a mouth.

9. The method of claim 1, wherein the first and second facial feature points of the first or second frames of the video include points of left and right pupils, tip of a nose, and left and right corners of a mouth.

10. An apparatus comprising:
processing circuitry configured to:
receive a first vector of a first frame in a video, and second vectors of a first set of second frames that are prior to the first frame in the video, the first vector formed by coordinates of first facial feature points in the first frame and determined based on a facial registration method performed over the first frame, each second vector of the second vectors of the first set of second frames is formed by coordinates of second facial feature points in the respective second frame;
determine a second vector of the first frame according to a fitting function, the fitting function specifying a relationship between the second vector of the first frame and the second vectors of the first set of second frames, the fitting function having a set of coefficients determined by minimizing a function including
a first component based on
(i) the second vectors of the first set of second frames from which an average of the second vectors of the first set of second frames is subtracted and (ii) the first vector of the first frame from which the average of the second vectors of the first set of second frames is subtracted, and a second component based on a square sum of the coefficients; and output a facial tracking result of the first frame based on the determined second vector of the first frame.

11. The apparatus of claim 10, wherein the processing circuitry is further configured to:

select a second set of second frames that are nearest to the first frame according to a display order among a third set of second frames that are prior to the first frame and have second vectors; and select the first set of second frames the second vectors of which having shortest Euclidean distances to the first vector of the first frame among that of the second set of second frames.

12. The apparatus of claim 10, wherein the processing circuitry is further configured to:

determine the set of coefficients by minimizing the following function:

$$L(q_1, \ldots, q_N) = \left\| \sum_{i=1}^{N} q_i C'_i - P'_k \right\|_2^2 + \lambda S \sum_{i=1}^{N} q_i^2,$$

where N represents a number of the first set of second frames, $q_i$ represents one of the set of coefficients, $C'_i$ represents one of the second vectors of the first set of second frames from which the average of the second vectors of the first set of second frames is subtracted, $P_k'$ represents the first vector of the first frame from which the average of the second vectors of the first set of second frames is subtracted, S represents a first parameter, and $\lambda$ represents a second parameter.

13. The apparatus of claim 12, wherein the processing circuitry is further configured to:

determine the first parameter S based on a range of vertical or horizontal coordinates of the first vector of the first frame.

14. The apparatus of claim 13, wherein the processing circuitry is further configured to:

adjust the second parameter $\lambda$ based on a variance of content of frames in the video.

15. A non-transitory computer-readable storage medium storing instructions which, when executed by at least one processor, cause the at least one processor to perform a method of facial tracking, the method comprising:

receiving a first vector of a first frame in a video, and second vectors of a first set of second frames that are prior to the first frame in the video, the first vector formed by coordinates of first facial feature points in the first frame and determined based on a facial registration method performed over the first frame, each second vector of the second vectors of the first set of second frames is formed by coordinates of second facial feature points in the respective second frame;

determining a second vector of the first frame according to a fitting function, the fitting function specifying a relationship between the second vector of the first frame and the second vectors of the first set of second frames, the fitting function having a set of coefficients determined by minimizing a function including a first component based on (i) the second vectors of the first set of second frames from which an average of the second vectors of the first set of second frames is subtracted and (ii) the first vector of the first frame from which the average of the second vectors of the first set of second frames is subtracted, and a second component based on a square sum of the coefficients; and outputting a facial tracking result of the first frame based on the determined second vector of the first frame.

16. The non-transitory computer-readable storage medium of claim 15, wherein the method further comprises:

selecting a second set of second frames that are nearest to the first frame according to a display order among a third set of second frames that are prior to the first frame and have second vectors; and selecting the first set of second frames the second vectors of which having shortest Euclidean distances to the first vector of the first frame among that of the second set of second frames.

17. The non-transitory computer-readable storage medium of claim 15, wherein the method further comprises:

determining the set of coefficients by minimizing the following function:

$$L(q_1, \ldots, q_N) = \left\| \sum_{i=1}^{N} q_i C'_i - P'_k \right\|_2^2 + \lambda S \sum_{i=1}^{N} q_i^2,$$

where N represents a number of the first set of second frames, $q_i$ represents one of the set of coefficients, $C'_i$ represents one of the second vectors of the first set of second frames from which the average of the second vectors of the first set of second frames is subtracted, $P_k'$ represents the first vector of the first frame from which the average of the second vectors of the first set of second frames is subtracted, S represents a first parameter, and $\lambda$ represents a second parameter.

* * * * *